E. RHODY.
VEHICLE WHEEL.
APPLICATION FILED FEB. 3, 1917.

1,273,924.

Patented July 30, 1918.
3 SHEETS—SHEET 1.

Witness
E. H. Wagner,

Inventor
Elza Rhody
By Robert Cobb
Attorneys

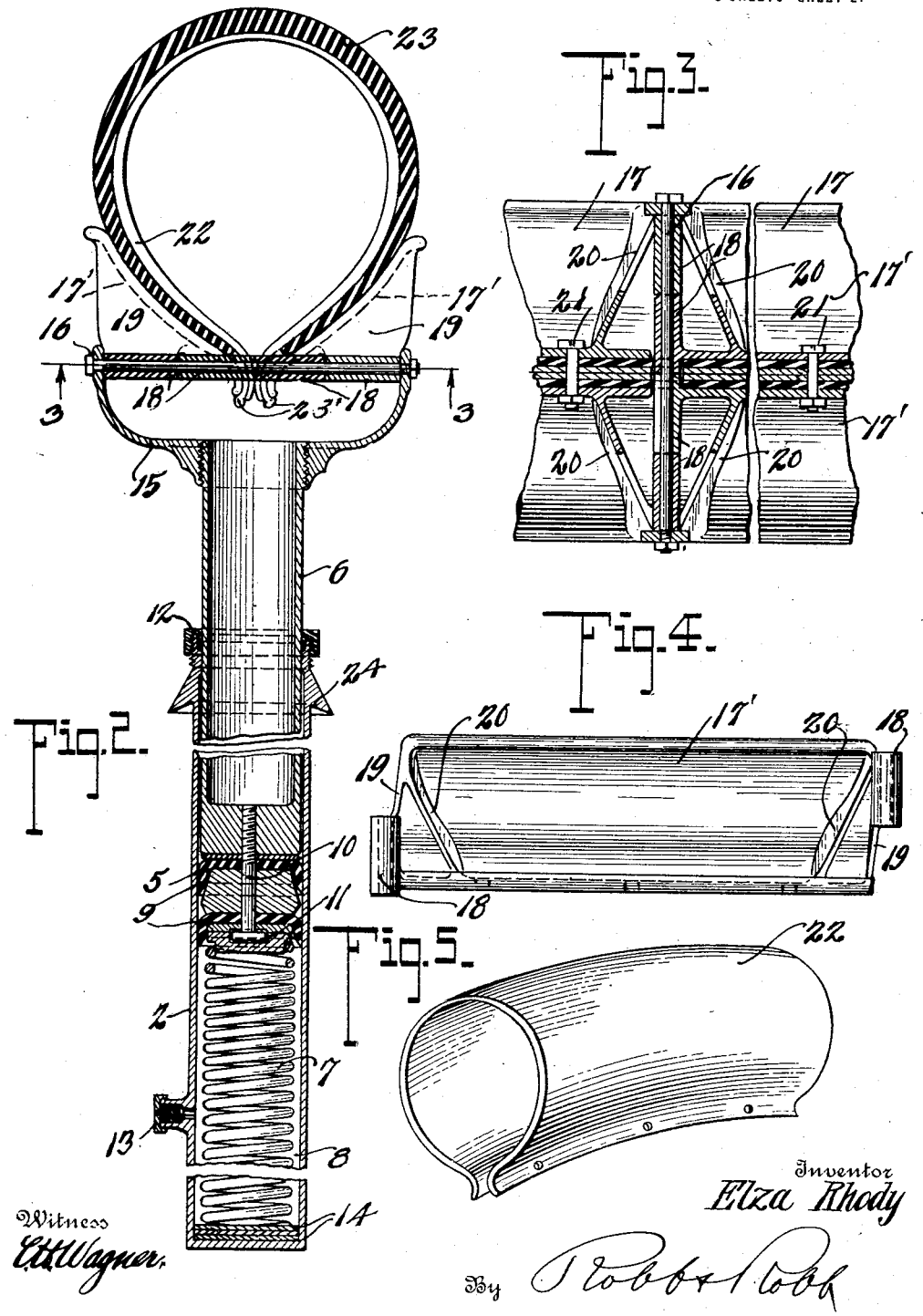

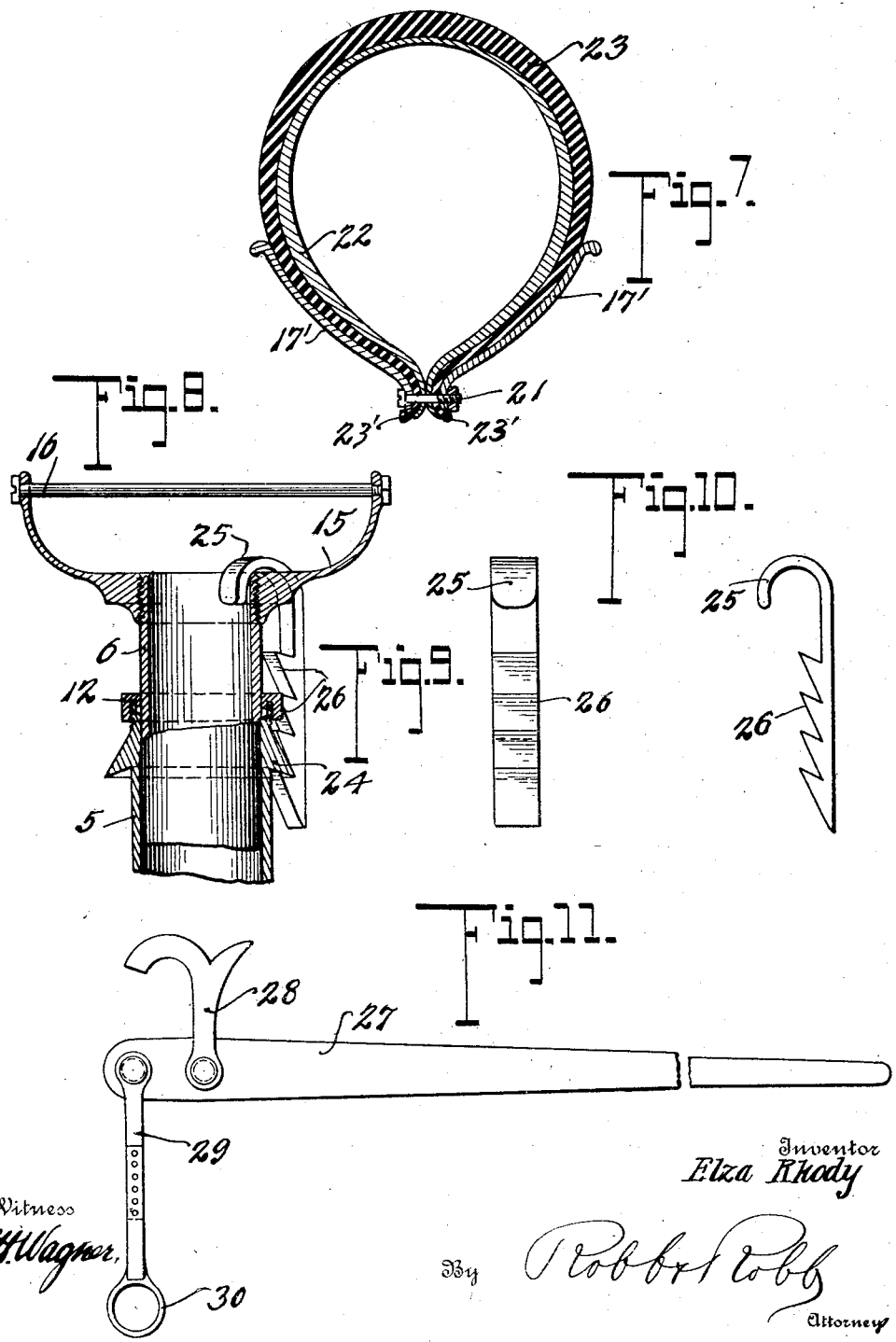

UNITED STATES PATENT OFFICE.

ELZA RHODY, OF FARMLAND, INDIANA, ASSIGNOR OF ONE-HALF TO EDGAR T. BOTKIN, OF FARMLAND, INDIANA.

VEHICLE-WHEEL.

1,273,924.    Specification of Letters Patent.    Patented July 30, 1918.

Application filed February 3, 1917. Serial No. 146,499.

*To all whom it may concern:*

Be it known that I, ELZA RHODY, a citizen of the United States, residing at Farmland, in the county of Randolph and State of Indiana, have invented certain new and useful Improvements in Vehicle-Wheels, of which the following is a specification.

The present invention relates to improvements in vehicle wheels of that type known in the art as spring wheels. It is my object to provide such a device as will afford the maximum amount of resiliency obtainable in a pneumatic tire structure while dispensing with the usual disadvantages of such structures incidental to puncturing of the air cushion.

The invention comprises yieldable spoke elements and a sectional rim permitting relative yielding of the parts, the rim sections being so constructed as to clamp a tire construction to the wheel.

It is furthermore proposed to construct the spokes with cushion means which comprises an air cushion enhancing the resilient effect of springs embodied in the spokes and supporting the rim structure.

For a full understanding of the present invention, reference is to be had to the following description and the accompanying drawings, in which:

Fig. 2 is a sectional view on the plane indicated by the line 2—2 of Fig. 1.

Fig. 3 is a sectional view on the line 3—3 of Fig. 2.

Fig. 4 is a bottom plan view of one of the sections of a rim segment.

Fig. 5 is a perspective view of one of the resilient shell members of the tire structure.

Fig. 7 is a transverse section through the rim portion of the wheel.

Fig. 8 is a fragmentary sectional view showing the application of a holding means for facilitating the removal of the rim sections.

Figs. 9 and 10 are front and side elevations of the holding member just referred to.

Fig. 11 is a side elevation of a tool for compressing the spoke members when it is desired to remove a rim section or a spoke element.

Figure 1:
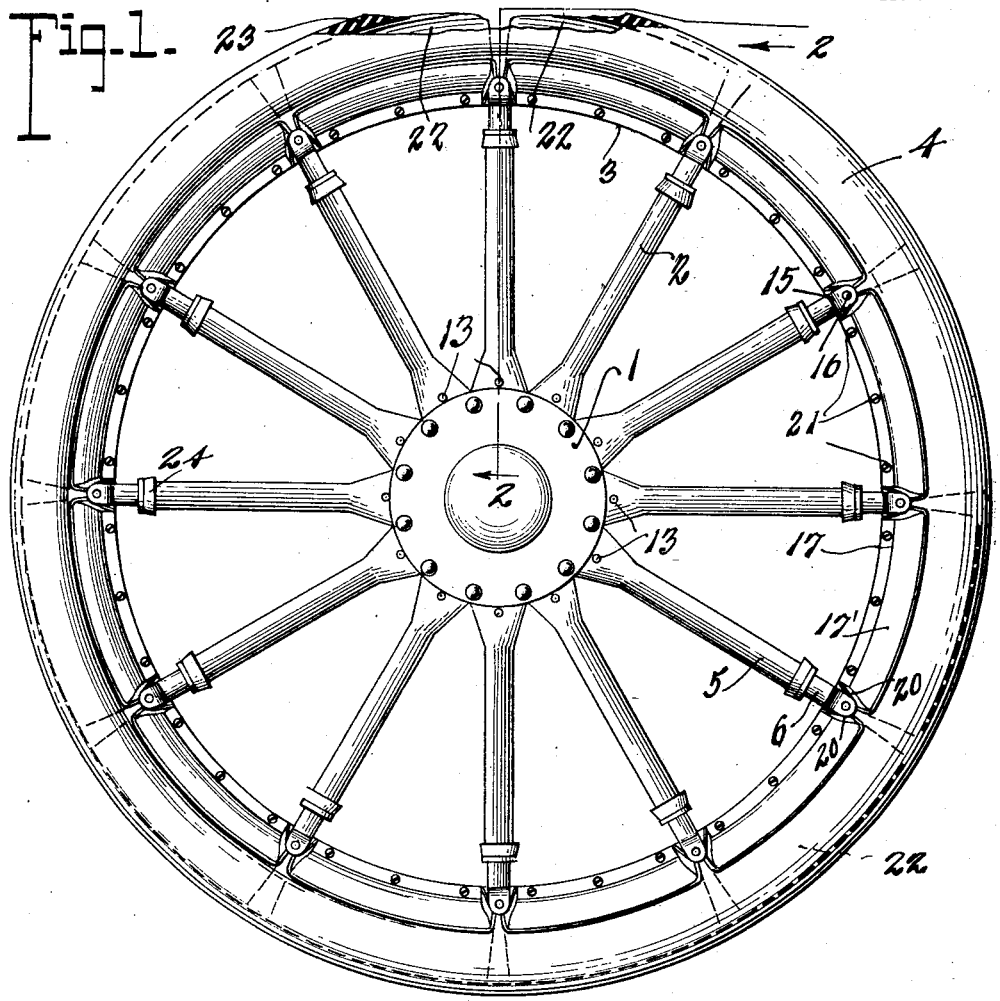
Figure 1 is a side elevation of a wheel constructed in accordance with my invention.

Referring to the drawings and specifically describing the invention 1 designates a hub, 2, a series of spokes, 3, the rim of the wheel, and 4, the tire structure. It will be observed by reference to Fig. 2 that each spoke consists of a tubular relatively stationary section 5 and a plunger member 6 operable therein. To the inner end of this plunger member is fixedly connected a spring 7 seated in the air chamber 8 of the tubular member 5. This spring affords a yieldable cushion for the spoke member 6 as will be obvious. To prevent the escape of air past the inner end of the spoke member 6 I secure to this inner end spaced leather cups 9 held by means of a fastening member or bolt 10, the head of which is removably inserted in a clamping disk 11 to which one end of the spring 6 is fixedly connected. At its outer portion the tubular member 5 is provided with a packing gland 12 which suitably lubricates the wall of the spoke member 6 and prevents the same from rattling in the use of the wheel.

The chamber 8 of the tubular member is provided at one side with an escape valve 13 from which the air may escape gradually under the action of the plunger member of the spoke, this construction affording a maximum resilience while at the same time sufficient support for carrying the load on the vehicle wheel. In order that the spoke members 6 may be properly adjusted and to compensate for any difference of tension of the springs used therein, washers may be employed as filler members in the inner portion of the air chambers 8, as indicated at 14 in Fig. 2.

To the outer extremity of each spoke member 6 is removably connected a forked bracket 15 and through suitable apertures a pivot bolt 16 extends. To this pivot bolt are connected the adjacent ends of a pair of rim segments 17 of which the rim 3 is composed. Each segment 17 of the rim consists of complemental clamping members or sections 17' one of which is most clearly shown in Fig. 4 of the drawing. It will be observed that at each end is provided an apertured lug 18 by means of which the respective sections are connected to the pivot bolt 16 just above referred to. Each of these rim or clamping sections furthermore is provided with an end web 19 and a diagonally arranged web 20 leading therefrom, the object of which is to suitably strengthen this member to withstand the strains incidental to the use of the wheel.

These separable members of the respective rim segments are connected by means of clamping bolts 21 and said sections are designed to clamp the tire structure upon the rim as will now be described.

For each rim segment 17 I provide correspondingly a tubular spring or shell 22, one of which is shown in Fig. 5, the inner circumferential edges of which are suitably apertured so that when the said edges are positioned between the clamping members of its particular rim segment, the clamping bolts 21 may be passed therethrough thereby clamping the springs 22 in place.

Figure 6:
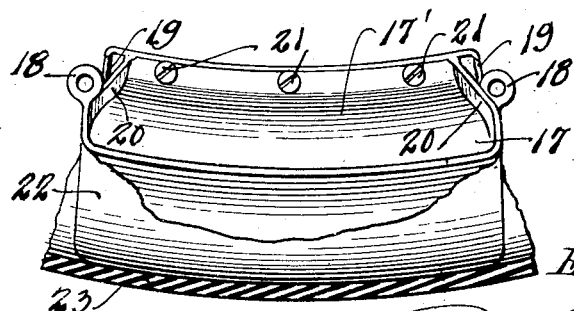
Fig. 6 is a fragmentary sectional view of the rim portion of the wheel.

Furthermore these springs, as is also true of the rim sections, are cut away at their ends as particularly shown in Figs. 1 and 6 so as to permit of relative movement of the said sections on their pivots as each portion of the rim receives the weight placed upon the vehicle wheel.

I preferably employ a continuous casing as a part of the tire structure 4, designated 23, the inner circumferential edges of which are beaded as indicated at 23′, and also are clamped between the edges of the clamping members of the respective rim segments. It will be apparent that the tire structure thus provided has the general appearance of the usual pneumatic tire and yet is not subject to puncture but depends upon the resilience of the springs 22 and the cushion action of the spoke construction for providing a yieldable wheel construction capable of use in any type of motor or other vehicle.

The parts of the wheel construction are easily replaceable when repair is required or readily removable for this purpose as will now be set forth.

At the outer end each tubular spoke member 5 is provided with an annular flange or projection 24 and when it is desired to disconnect a spoke for the removal of its plunger member or removal of a rim section, holding means most clearly shown in Figs. 9 and 10 is employed. This tool member consists of a hook extremity 25 and a series of serrations or projections 26 the former being adapted for engagement over the outer extremity of the member 6 of the spoke and the latter being adapted for engagement with the annular flange 24, as clearly shown in Fig. 8. To enable this engagement, it is desirable to employ means for compressing the spring 7 of the spoke construction and I, therefore, provide a lever 27 having at one end a pivotal hook member 28 and adjacent thereto a link 29 pivotally connected at one end and provided with a hub engaging ring 30 at its other end. By slipping the ring over the hub of the wheel and the hook 28 over the rim and pressing downwardly on the lever 27 the spoke section may be depressed and the holding member engaged in the position just above referred to.

Various changes and refinements may be made in the details of the construction hereinbefore described without departing from the spirit of the invention and within the scope of the claims hereto appended.

Having thus described my invention, what I claim as new is:

1. A vehicle wheel comprising a hub, a sectional rim and a series of spokes connected at one end to the hub and to the respective rim sections, each spoke comprising a tubular member, a plunger operable therein, cup members connected to the inner end of the plunger, a spring seated within the tubular member, means connecting the spring and cup members to the plunger to provide a detachable spoke unit, and a valve for said tubular member.

2. A vehicle wheel comprising a hub, a sectional rim and a series of spokes connected at one end to the hub and to the respective rim sections at the other end, each spoke comprising a relatively stationary section and a spring actuated section, one of said sections having a projection, and means engageable with said projection and the other spoke section for holding the latter against spring action whereby to permit of removal of a rim section.

3. A vehicle wheel comprising a hub, a sectional rim and a series of spokes, each spoke comprising a tubular member and a yieldable plunger member, pivot connections for said spoke and rim sections, an annular flange on each tubular spoke member, and a hook device adapted for engagement with the yieldable plunger member and with the annular flange aforesaid to hold said plunger member in inoperative position.

In testimony whereof I affix my signature.

ELZA RHODY.

Copies of this patent may be obtained for five cents each, by addressing the "Commissioner of Patents, Washington, D. C."